United States Patent
Jiang et al.

(10) Patent No.: US 11,030,990 B2
(45) Date of Patent: *Jun. 8, 2021

(54) AUTOMATIC ANSWER REPHRASING BASED ON TALKING STYLE

(71) Applicant: International Business Machines Corporation, Armonk, NY (US)

(72) Inventors: Jian Min Jiang, Beijing (CN); Yuan Ni, Shanghai (CN); Guo Yu Tang, Beijing (CN); Guo Tong Xie, Xi Er Qi (CN); Shi Wan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/561,929

(22) Filed: Sep. 5, 2019

(65) Prior Publication Data

US 2019/0392813 A1 Dec. 26, 2019

Related U.S. Application Data

(63) Continuation of application No. 15/785,657, filed on Oct. 17, 2017, now Pat. No. 10,418,023.

(51) Int. Cl.
*G06F 40/56* (2020.01)
*G10L 13/033* (2013.01)
(Continued)

(52) U.S. Cl.
CPC ............ *G10L 13/033* (2013.01); *G06F 40/56* (2020.01); *G10L 13/047* (2013.01); *G10L 15/18* (2013.01);
(Continued)

(58) Field of Classification Search
CPC ........ G06F 17/20; G06F 17/21; G06F 17/218; G06F 17/2282; G06F 17/24;
(Continued)

(56) References Cited

U.S. PATENT DOCUMENTS

| 9,311,294 B2 | 4/2016 | Allen et al. |
| 9,336,259 B1 | 5/2016 | Kane |

(Continued)

FOREIGN PATENT DOCUMENTS

KR 10-2016-0085021 A 7/2016

OTHER PUBLICATIONS

Non-Final Office Action received for U.S. Appl. No. 15/785,657 dated Dec. 13, 2018, 22 pages.

*Primary Examiner* — Qi Han
(74) *Attorney, Agent, or Firm* — Amin, Turocy & Watson, LLP

(57) ABSTRACT

Techniques are described that facilitate automatically providing entities with rephrased versions of standard answers. In one embodiment, a computer-implemented is provided that comprises determining, by a device operatively coupled to a processor, a talking style of a plurality of talking styles that an entity is associated with based on reception of natural language input from the entity proposing a question related to a defined topic. The method further comprises selecting, by the device based on the talking style, an answer rephrasing model from a plurality of answer rephrasing models respectively configured to generate different rephrased versions of a standard answer to the question, and employing, by the device, the answer rephrasing model to generate a rephrased version of the standard that corresponds to the talking style.

18 Claims, 10 Drawing Sheets

(51) Int. Cl.
  *G10L 13/047*   (2013.01)
  *G10L 15/22*    (2006.01)
  *G10L 15/18*    (2013.01)
  *G06F 40/20*     (2020.01)

(52) U.S. Cl.
  CPC .............. *G10L 15/22* (2013.01); *G06F 40/20* (2020.01); *G10L 2015/223* (2013.01)

(58) Field of Classification Search
  CPC ................ G06F 17/245; G06F 17/248; G06F 17/27278; G06F 17/279; G06F 17/2795; G06F 17/28; G06F 17/2827; G06F 17/2881; G06F 40/56; G06F 40/00; G06F 40/10; G06F 40/20; G06F 40/30; G06F 40/35; G06F 40/49
  USPC ......................... 704/9, 2, 3, 4, 5, 7, 10, 257
  See application file for complete search history.

(56) References Cited

U.S. PATENT DOCUMENTS

| | | |
|---|---|---|
| 2003/0018629 A1 | 1/2003 | Namba |
| 2007/0192292 A1 | 8/2007 | Imielinski |
| 2013/0179151 A1 | 7/2013 | Iverson |
| 2014/0358631 A1 | 12/2014 | Ghose et al. |
| 2015/0201075 A1 | 7/2015 | Fan et al. |
| 2016/0148114 A1* | 5/2016 | Allen .................... G06N 20/00 706/11 |
| 2018/0365212 A1* | 12/2018 | Banerjee ................ H04L 67/36 |

* cited by examiner

AUTOMATIC ANSWER REPHRASING BASED ON TALKING STYLE

TECHNICAL FIELD

This application relates to computer-implemented techniques for automatically rephrasing an answer to a question to accommodate the talking style of the entity proposing the question.

SUMMARY

The following presents a summary to provide a basic understanding of one or more embodiments of the invention. This summary is not intended to identify key or critical elements, or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products that provide for automatically rephrasing an answer to a question to accommodate the talking style of the entity proposing the question.

According to an embodiment of the present invention, a system can comprise a memory that stores computer executable components and a processor that executes the computer executable components stored in the memory. The computer executable components can comprise a classification component that determines a talking style of a plurality of talking styles that an entity is associated with based on reception of natural language input from the entity proposing a question related to a defined topic. For example, in some implementations, the defined topic can comprise health and medicine. According to this example, the entity can include a patient that is asking a question about a particular medical illness or condition. The computer executable components can also comprise a model selection component that selects, based on the talking style, an answer rephrasing model from a plurality of answer rephrasing models respectively configured to generate different rephrased versions of a standard answer to the question. The computer executable components can further comprise a rephrasing component that employs the answer rephrasing model to generate a rephrased version of the standard that corresponds to the talking style. In one or more embodiments, the different answer rephrasing models of the plurality of answer rephrasing models are tailored to different talking styles of the plurality of talking styles.

In some implementations, the computer executable components further comprise a clustering component that determines the plurality of talking styles based on analysis of parallel corpus question and answer data comprising different versions of questions related to the defined topic that respectively correspond to same standard answers. In various embodiments, the different answer rephrasing models respectively employ a neural network structure and the computer executable components further comprise a modeling component that generates the different answer rephrasing models by training the different answer rephrasing models using parallel corpus question and answer data that comprises different versions of same standard answers and respectively associates the different versions with the different talking styles.

In one or more embodiments, respective answer rephrasing models of the plurality of answer rephrasing models can employ a sequence-to-sequence type of recurrent neural network architecture. According to these embodiments, the respective answer rephrasing models can employ a copy function and a restricted generative function to determine the different rephrased versions of the standard answer to the question. For example, in one implementation, the respective answer rephrasing models can determine the different rephrased versions of the standard answer to the question based on encoding the standard answer and the question, thereby resulting in an encoded answer and an encoded question. The respective answer rephrasing models can further determine the different rephrased versions of the standard answer to the question using either the copy function or the restricted generative function to decode respective parts of the encoded answer and the encoded question. For example, the respective answer rephrasing models can comprise a selection component that determines whether to apply the copy function or the restricted generative function to decode the respective parts of the encoded answer and the encoded question. The copy function can select a term or phrase from the standard answer, and the restricted generative function can select an alternative term or phrase from an alignment table data that correlates one or more alternative terms or phrases with standard terms or phrases of the standard answer.

In some embodiments, elements described in connection with the disclosed systems can be embodied in different forms such as a computer-implemented method, a computer program product, or another form.

DETAILED DESCRIPTION

Figure 1:
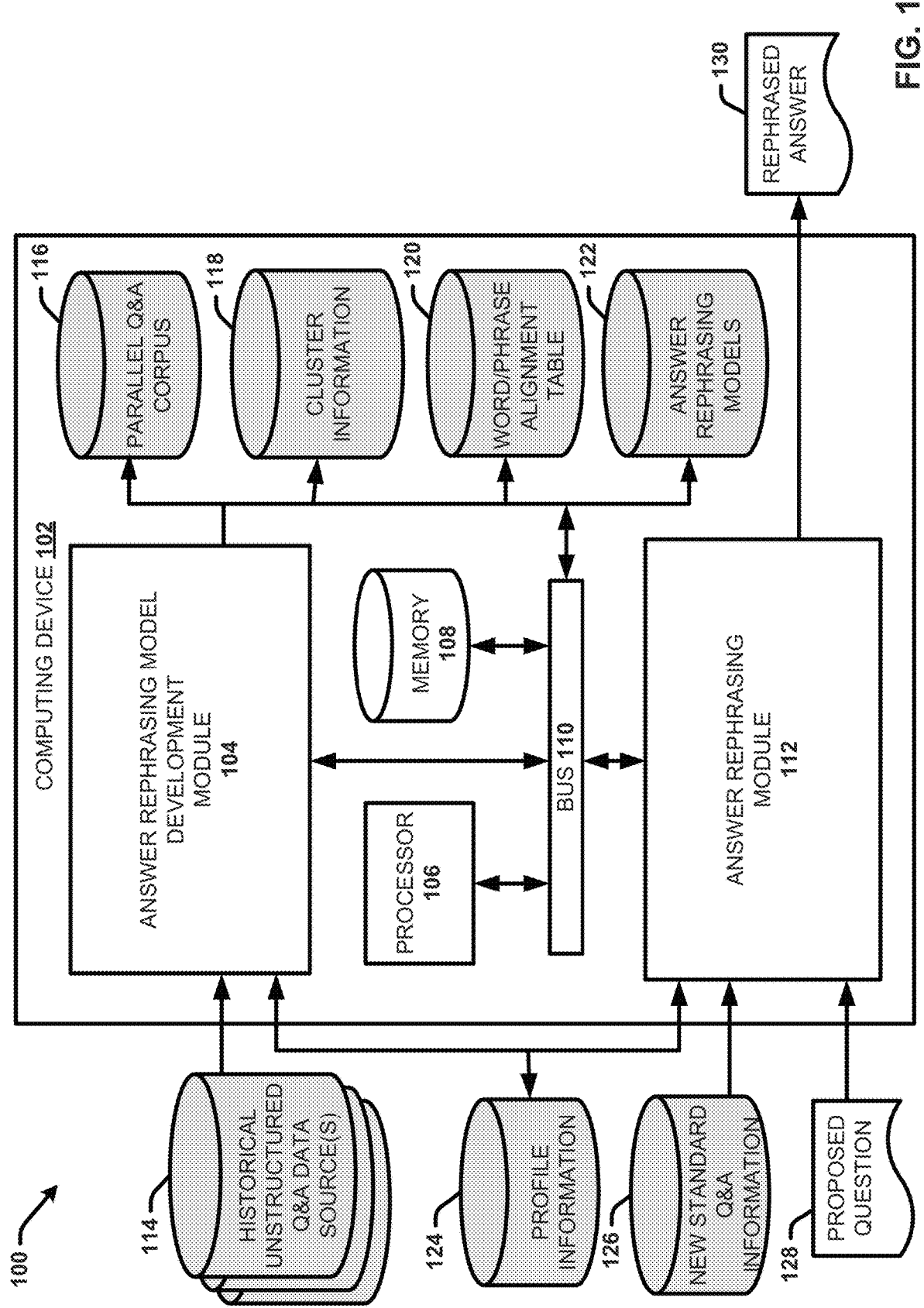
FIG. 1 illustrates a block diagram of an example, non-limiting system that facilitates automatically rephrasing an answer to a question to accommodate the talking style of the entity proposing the question in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Summary section or in the Detailed Description section.

The subject disclosure provides systems, computer-implemented methods, apparatus and/or computer program products that facilitate automatically providing entities with rephrased answerers to their questions to accommodate their respective talking styles. In this regard, as used herein the term entity can include various types of entities, such as a human, a user, a machine, a computer, a system, a device, and the like. The Internet has enabled people to find answers to almost any conceivable question by simply typing the answer into a search engine. However, due to the vast amount of data sources available, the search results can include a plethora of different answers, leaving the entity to parse through the different answers to find one that the entity can understand and/or that seems to be the most accurate. This is a time consuming and exhausting manual task that often results in the entity being misinformed and confused as to what the correct answer to the question is. The disclosed systems, computer-implemented methods, apparatus and/or computer implemented methods not only provide entities with correct answers to a specific question in a give topic, but further automatically rephrase the answer from a standard or formal textbook answer to a tailored answer that matches the talking styles of the respective entities. As a result, the entity can be provided with an answer that is easily understandable to the entity. Thus, as further described in the following, computational natural language processing of a received input question from an entity is enhanced by, among other things, generating a corresponding answer to the received input question that is based on certain aspects of the entity (e.g., the talking style of entity).

The disclosed techniques for automatically providing entities with rephrased answers to their questions can be divided into a model development process and a model application process. The model development process generally involves employing one or more machine learning techniques to develop or train one or more mathematical models to determine different versions of standard or textbook answers to a defined set of questions based on different talking styles. More particularly, in one or more embodiments, the model development process can involve the usage and/or development of parallel corpus question and answer data that correlates standard questions with standard answers and further correlates each standard answer (or in some implementations one or more of the standard answers) with one or more different versions of the standard that are respectively associated with different talking styles. For example, in some embodiments, the parallel corpus question and answer data can be generated based on historical question and answer data comprising entity proposed versions of the questions and different entity provided versions of answers to the respective questions. In this regard, the different versions of the answers can be associated with different entities and these entities can be associated with different talking styles. The different entities and their respective answers can further be clustered or grouped based on their associated talking styles. For example, in one implementation, the different talking styles can reflect a degree of technical understanding of a particular topic or subject associated with a set of questions, such as a poor understanding, a basic understanding, and a high understanding. According to this example, very simplified versions of answers to the question could be associated with a talking style indicative of a low understanding, more general versions of the answers could be associated with a talking style indicative of a higher understanding, and highly technical versions of the answers could be associated with a talking style indicative of a high understanding. In some embodiments, the talking styles can be predefined. In other embodiments, the talking styles can be determined based on analysis of the different entities represented in the historical data.

Using the parallel corpus question and answer data, a defined neural network model can be trained on each type (or in some implementations one or more) of talking style to learn how to automatically rephrase or rewrite the respective standard answers for each talking style. In this regard, based on the many different ways the different standard answers are rephrased in the historical data for a particular talking style, the neural network model can learn a set of rules that controls how the standard answers should be modified to fit the particular talking style. In one or more embodiments, the defined neural network model can be trained on each (or in some implementations one or more) type of talking style, resulting in the generation of a different answer rephrasing model for each type of talking style. The respective answer rephrasing models can determine the manner in which to re-write or rephrase a standard answer to an entity question based on evaluation of both the proposed question and the standard answer.

The model application process involves employing the different answer rephrasing models to automatically generate rephrased versions to entity proposed questions based on the talking styles of the respective entities. In this regard, the answer rephrasing models can generate different rephrased version of standard answers to standard questions included in the parallel corpus question and answer corpus database when proposed by entities in real-time. In some implementations, the answer rephrasing models can also generate different rephrased versions of new standard answers to new standard questions that were not originally included in the parallel question and answer corpus database used to train the models, so long as the new standard answers and new standard questions are related to the same topic/subject as the questions and answers in the parallel question and answer corpus database.

In various embodiments, the disclosed techniques are exemplified in association with facilitating automatically providing entities with rephrased answers to medical questions. In particular, entities often use the Internet to find answers to various health and medical related questions as opposed asking a medical healthcare professional directly or to obtain information they were unable to discuss in depth with a medical healthcare profession during an in-person visit. An experienced healthcare professional generally knows how to explain the answer to a particular medical question at a level at which the healthcare professional assumes particular individual would understand based on their interaction with that individual. However, the answers to medical questions returned by these types of Internet searches generally include standard medical answers found in medical textbooks. These standard textbook answers often involve complex medical terminology and require an understanding of physiological processes that are beyond the understanding of an average individual. In this regard, the answers to many medical questions found online are are generally dry and impersonalized to fit the intelligence level, emotional state, mental state, age, cultural background, and the like of the patient. For example, how a doctor would explain a complex medical issue to an old lady that never went to school would be much different than how the doctor would explain the same issue to a PhD graduate that is well versed in current medical practices and technology.

Thus in various embodiments, the disclosed techniques can be employed to develop and employ answer rephrasing models that are designed to generate rephrased answers to medical questions for different groups of individuals. In this regard, the individuals can be grouped based on their respective talking styles, wherein each talking style can reflect a particular style with respect to word choice and syntax in which the entity generally best comprehends answers to various medical questions. In some implementations, the individuals can also be grouped based on one or more additional factors, including but not limited to: age, intellectual level, educational level, cultural background, mental state, medical history, and the like. However, it should be appreciated that the disclosed techniques are not restricted to automatic answer rephrasing for solely medical related questions. In this regard, the disclosed techniques can be employed to develop and apply answer rephrasing models for a variety of different subjects and a variety of different entity groups.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates automatically rephrasing an answer to a question to accommodate the talking style of the entity proposing the question in accordance with one or more embodiments of the disclosed subject matter. System 100 or other systems detailed herein can provide technical improvements in substantially any field that involves question and answer forums and more particularly to fields wherein human based question and answer forums are considered more favorable than machine based systems for answering entity questions due the ability for humans to provide tailored answers to each individuals level of understanding. In this regard, system 100 and/or the components of the system 100 or other systems disclosed herein provide for developing and employing answer rephrasing models that are intelligently trained using machine learning to re-write standard answers to questions such that the re-written answers are tailored to different talking styles of the entities that propose the questions. As a result, not only can an individual propose a question and be automatically provided with a machine determined answer, the machine determined answer can be generated (e.g., written) in real-time to account for the talking style of the individual. More specifically, the answer provided to the individual is not merely selected from a previously generated database of different answers for different talking styles, but re-written or rephrased on the fly from a standard answer by an intelligently trained neural network seq2seq model. Accordingly, entities can be provided with tailored versions of the same answer to a difficult question that has been specifically tailored to their respective talking styles without manual observation and input. Furthermore, the time and effort envisioned for manually developing a single tailored answer for every possible talking style for every possible question in a particular subject area (e.g., health and medicine) can be eliminated.

System 100 and/or the components of the system 100 or other systems disclosed herein can be employed to use hardware and/or software to solve problems that are highly technical in nature, that are not abstract, and that cannot be performed as a set of mental acts by a human System 100 and/or components of system 100 or other systems described herein can also be employed to solve new problems that arise through advancements in technology, computer networks, the Internet, and the like. For example, system 100 and/or components of system 100 or other systems described herein can access and leverage big data from various unstructured data sources to automatically generate a parallel corpus of question and answer data for a particular subject (e.g., health and medicine). System 100 and/or components of system 100 (another systems describe herein), can further employ the parallel corpus to train a new type of neural network seq2seq model to re-wright or rephrase standard answers based on different talking styles.

Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. For example, in the embodiment shown, system 100 includes a computing device 102 that includes an answer rephrasing model development module 104 and an answer rephrasing module 112 which can respectively correspond to machine-executable components. System 100 also includes various electronic data sources and data structures comprising information that can be read by, used by and/or generated by the answer rephrasing model development module 104 and/or the answer rephrasing module 112. For example, these data sources and data structures can include but are not limited to: one or more historical unstructured question and answer (Q&A) data sources 114, the parallel question and answer corpus 116, the cluster information 118, the word/phrase alignment table 120, one or more answer rephrasing models 122, the profile information 124, the new standard question and answer information 126, the proposed question 128, and the rephrased answer 130.

The computing device 102 can include or be operatively coupled to at least one memory 108 and at least one processor 106. The at least one memory 108 can further store executable instructions (e.g., the answer rephrasing model development module 104 and/or the answer rephrasing module 112) that when executed by the at least one processor 106, facilitate performance of operations defined by the executable instruction. In some embodiments, the memory 108 can also store the various data sources and/or structures of system 100 (e.g., the parallel question and answer corpus 116, the cluster information 118, the word/phrase alignment table 120, the one or more answer rephrasing models 122, the profile information 124, and the like). The computing device 102 can further include a device bus 110 that communicatively couples the various components and data sources of the computing device 102 (e.g., the answer rephrasing model development module 104, the processor 106, the memory 108, the answer rephrasing module 112), the parallel question and answer corpus 116, the cluster information 118, the word/phrase alignment table 120, and the one or more answer rephrasing models 122). In other embodiments, the various data sources and structure of system 100 can be stored in other memory (e.g., at a remote device or system), that is accessible to the computing device 102 (e.g., via one or more networks). Examples of said processor 106 and memory 108, as well as other suitable computer or computing-based elements, can be found with reference to FIG. 10, and can be used in connection with implementing one or more of the systems or components shown and described in connection with FIG. 1 or other figures disclosed herein.

In some implementations, the computing device 102, and/or the various components and data sources of system 100 can be communicatively connected via one or more networks. Such networks can include wired and wireless networks, including but not limited to, a cellular network, a wide area network (WAD, e.g., the Internet) or a local area network (LAN). For example, the computing device 102 can communicate with the historical unstructured question and answer data sources 114 (and vice versa) and other devices (e.g., a client device providing a proposed question 128 and receiving a rephrased answer 130) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. The computing device 102 can thus include hardware (e.g., a central processing unit (CPU), a transceiver, a decoder), software (e.g., a set of threads, a set of processes, software in execution) or a combination of hardware and software that facilitates communicating information between the computing device 102 and externals systems, sources and devices.

In one or more embodiments, the answer rephrasing model development module 104 can perform various functions that are directed to developing or training one or more answer rephrasing models 122. The respective answer rephrasing models 122 can be specifically tailored to generate different rephrased or re-written versions of standard answers to questions, wherein each (or in some implementations, one or more) of the different rephrased or re-written versions are specifically tailored to a different entity group. In various embodiments, the different entity groups can be defined based on different talking styles, wherein each (or one or more) entity group is associated with a different talking style. The term talking style (or speech style) as used herein refers to the preferred words and syntax that are used and understood by an individual. For example, with respect to medical terminology, one particular entity talking style can reflect usage of highly technical medical terms in a manner that conveys deep understanding in a particular medical topic. On the other side of the spectrum, another entity talking style can reflect usage of non-technical medical terms and little to no understanding in the particular medical topic. In another example, different talking styles can reflect different degrees of formal/proper word choice and syntax (e.g., a causal talking style, a slang talking style, a proper talking style). In another example, different talking styles can reflect different types of word choice and syntax associated with different cultures or parts of the world.

The manner in which different talking styles are defined can vary based on the subject matter (e.g., the types of questions and answers) for which the one or more answer rephrasing models 122 are employed to automatically generate rephrased answers. For example, with respect to medical questions and answers, in some implementations, the talking styles can be defined based on levels of knowledge in the medical field associated with a particular question. According to this example, entities with little or no knowledge can be associated with a level 1 talking style, entities with basic knowledge can be associated with a level 2 talking style, entities with greater knowledge can be associated with a level 3 talking style and so on. For example, with respect to the medical "Question what is hyperlipidemia?", an entity with a level 1 talking style might understand and/or prefer a basic answer such as: "Hyperlipidemia means you have high cholesterol which means that you have high amounts of fat in your blood". On the other hand, an entity with a level 2 talking style might understand and/or prefer a bit more of a technical answer, such as: "Hyperlipidemia, or high cholesterol, means the combined concentration of lipoproteins and triglycerides in the blood exceeds the recommended level".

In various embodiments, the one or more answer rephrasing models 122 can be based on a recurrent neural network machine learning mathematical model. According to these embodiments, the answer rephrasing model development module 104 can train the machine learning model how to re-write or rephrase a set of standard answer to a set of standard questions for different entity groups, such as different entity groups associated with different talking styles. In some implementations, the training data used to train the machine learning model can include a parallel question and answer corpus, such as parallel question and answer corpus 116. The parallel question and answer corpus 116 can comprise a set of standard questions and the standard answers for the respective questions. For example, with respect to the medical field, the standard questions can include a set of predefined medical questions and their corresponding textbook answers. Further, for each (or in some implementations one or more) of the standard answers, the parallel question and answer corpus 116 can include a collection of different versions of the standard answers. In some implementations, for each (or in some implementations one or more) of the standard question, the parallel question and answer corpus 116 can also include a collection of different versions of the standard questions.

In one or more embodiments, the answer rephrasing model development module 104 can generate the parallel question and answer corpus 116 using information found at one or more unstructured question and answer data sources 114. For example, the one or more historical unstructured question and answer data sources 114 can include accessible text documents, media (e.g., audio and/or video), databases and the like with previously generated question and answer data, online communities or social forums with question and answer information, existing entity generated websites with question and answer information, and the like. According to these embodiments, the different versions of the answers to the standard questions included in the parallel question and answer corpus 116 can correspond to different versions found at one or more unstructured question and answer data sources 114. For example, the answer rephrasing model development module 104 can crawl the various historical unstructured data sources to find different versions of a standard answer to a question and associate these different versions with the standard answer in the parallel question and answer corpus 116. Similarly, many standard questions can be asked in different ways. In this regard, in some implementations, the answer rephrasing model development module 104 can also crawl the various unstructured data sources to find different versions of a standard question and associate these different versions with the standard question in the parallel question and answer corpus 116.

For example, with respect to medical questions and answers, in some implementations, the historical unstructured question and answer data sources 114 can include a data source with existing manually generated different versions of answers to different entity proposed version of a standard medical question. In this regard, the different versions of the answers provided can reflect the manner in which the entity proposed the question. In another example, some medical organizations provide a care management call-in service that allows entities to call in and speak with a medical healthcare professional to ask questions in person. With this example, the historical unstructured question and answer data sources 114 can include dialogue from recorded phone conversations that can be or has been converted to a text format. The dialogue can further be parsed to identify different versions of standard questions and answers provided to different individuals that call in. Medical organizations that provide human based question and answer chat forums, email forums or the like can also provide access to the resulting question and answer information that can include different versions of standard questions and answers proposed by actual people.

In yet another example, the one or more historical unstructured question and answer data sources 114 can include collated information received from patients in association with a follow-up medical reporting service. For example, some healthcare organizations provide a service that involves following up with patients to ask them regulatory medical questions. In this regard, the questions can be standard medical questions. However, the answers provided by the respective patients can include their individual typed, spoken or otherwise self-created answers provide in their own talking style. Accordingly, manner in which different patients respond to the same standard medical question can also provide training data that can be used to learn the types of words and syntax different entities with different talking styles understand and/or prefer in association with answering a same standard medical question.

In addition to developing the parallel question and answer corpus 116 with different versions of answers to questions, the answer rephrasing development module can further cluster the different answers based on different entity groups. In this regard, the answer rephrasing model development module 104 can examine a set of different versions of answers associated with a standard question and cluster or group the different versions of the answers into one or more subsets by talking style and/or one or more other distinguishing entity factors. In some implementations, information identifying and characterizing the different entity groups can be developed and stored as cluster information 118. The cluster information 118 can also identify the respective subsets of rephrased answers in the parallel question and answer corpus 116 associated with the different entity groups. Alternatively, each subset (or in some implementation one or more) of rephrased answers in the parallel question and answer corpus 116 can be associated with information identifying the particular entity group (e.g., talking style) that it is associated with.

The manner in which the answer rephrasing model determines the different entity groups and what particular entity group a particular version of standard answer or question belongs to can vary. In some implementations, the answer rephrasing model development module 104 can access and employ profile information 124 that identifies or indicates the entity group and/or talking style of the different entities that provided the question and answer variations included in the parallel question and answer corpus 116. In other implementations, the answer rephrasing model development module 104 can determine the talking styles of the respective entities based on analysis of the manners in which the respective entities provided questions and/or answers. The example mechanisms that can be employed by the answer rephrasing model development module 104 to determine the different entity groups and what particular entity group a particular version of standard answer or question belongs to are discussed in greater detail infra with reference to FIG. 3 and the clustering component 304.

Using the parallel question and answer corpus data, the answer rephrasing model development module 104 can further train the neural network model on each type (or in some implementations one or more) of the different entity groups/cluster (e.g., talking styles) to learn how to automatically rephrase or rewrite the respective standard answers for each entity group/cluster. For example, the defined neural network model can be trained on each (or in some implementations one or more) type of entity group, resulting in the generation of a different set of rules and thus the different answer rephrasing models 122 for each type of entity group. In this regard, based on the many different ways the different standard answers are rephrased in the parallel question and answer corpus 116 for a particular entity group, the neural network model can learn a set of rules that controls how the standard answers should be modified to fit the particular talking style. More particularly, for each different entity group (e.g., talking style) the neural network model can learn which parts of a standard answer to copy and which parts of the standard answer to replace with an alternative but similar word or phrase. As discussed in greater detail infra with reference to FIG. 3 and the alignment table generation component 306, in association with training the neural network model on the parallel question and answer corpus 116 information, the answer rephrasing model development module 104 can generate a word/phrase alignment table 120 that can be employed by the respective answer rephrasing models 122 in association selecting an alternative word or phrase to employ when re-writing or rephrasing standard answers to questions.

After the one or more answer rephrasing models 122, the parallel question and answer corpus 116, the cluster information 118 and the word/phrase alignment table 120 are developed, the answer rephrasing module 112 can employ one or more of these data sources and structures to automatically generate rephrased or re-written answers to entity proposed questions. For example, in one embodiment, the answer rephrasing module 112 can receive a proposed question 128 that includes a text string, audio (that can be converted to text), or the like that asks a question that either is or corresponds to a standard question for which there is known standard answer. In some implementations, the standard question and answer can be limited to one of those included in set of standard questions and answers provided in the parallel question and answer corpus 116. In this regard, the answer rephrasing module 112 can identify the standard question and the corresponding standard answer in the parallel question and answer corpus 116.

In other implementations, the standard question and answer can also include a new standard question and answer that is not included in the parallel question and answer corpus 116 but is similar or related to the types of questions and answers included in the parallel question and answer corpus 116. For example, with respect to medical questions and answers, in some implementation the parallel question and answer corpus 116 can include a only a sample of medical question and answers and that can be used to train the respective answer rephrasing models 122 and develop the word/phrase alignment table. According to this example, additional related or similar standard medical questions and answers can be provided and accessed in an additional database, identified in system 100 as new standard question and answer information 126. In this regard, based on the received proposed question 128, the answer rephrasing module 112 can further identify the corresponding standard question and standard answer in the parallel question and answer corpus 116 or the new standard question and answer information 126.

Using the proposed question 128 or the corresponding standard question, and the corresponding standard answer as input, the answer rephrasing module 112 can apply one of the answer rephrasing models 122 to generate a rephrased answer 130 to the question. This rephrased or re-written answer will be a version of the standard answers that is easy to understand by the entity that proposed the question or otherwise tailored to the needs of the entity because it will fit the entity group or talking style that the entity belong to. In this regard, the particular model that the answer rephrasing module applies can be selected to match or the entity group (e.g., talking style) associated with the entity. As described in greater detail infra with reference to FIG. 5, in some implementations, the answer rephrasing module 112 can access and employ known profile information for the entity that identifies or indicates the entity group (e.g., talking style) that the entity belongs to in order to determine which answer rephrasing model to apply. This known profile information is identified in system 100 as profile information 124. In other implementations, the answer rephrasing module 112 can determine the entity group or talking style of the entity based on analysis the manner in which the entity proposed the used question and/or one or more additional factors.

Figure 2:
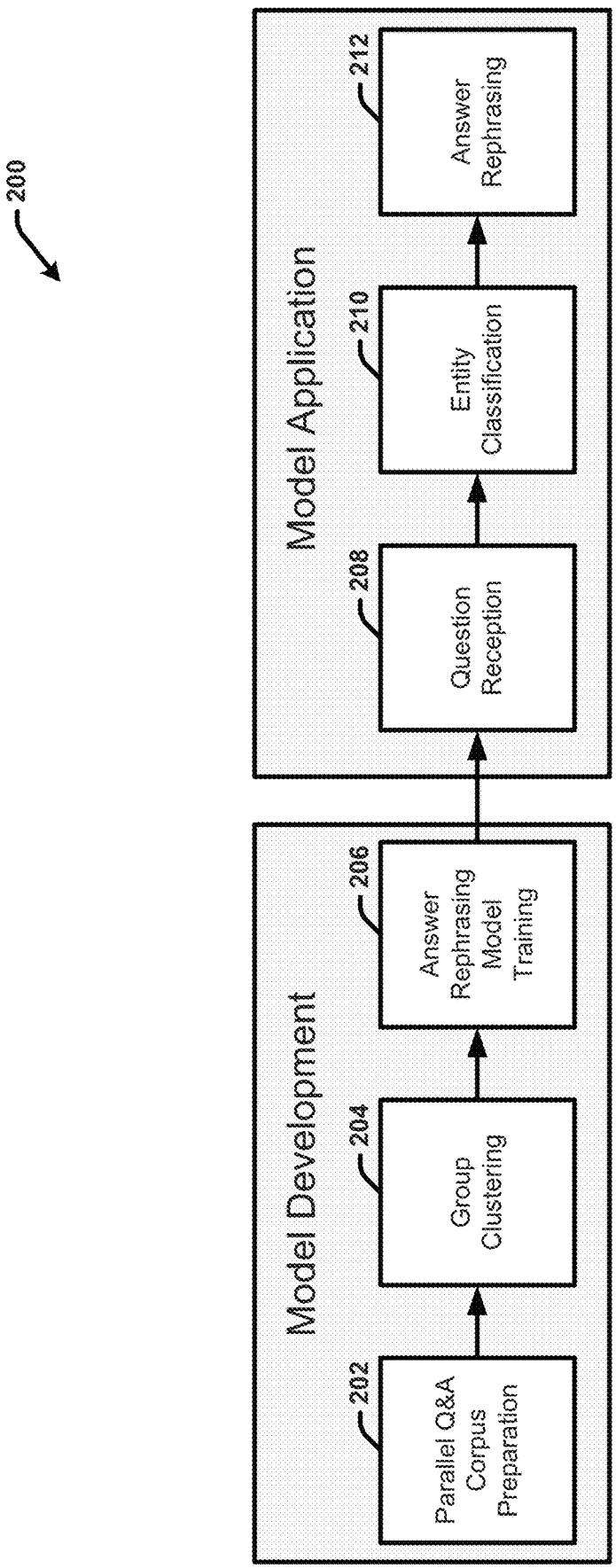
FIG. 2 illustrates a high level flow diagram of an example non-limiting computer-implemented process for developing and applying on or more answer rephrasing models to automatically rephrase answers to a question to accommodate the talking styles of the entities proposing the questions in accordance with one or more embodiments of the disclosed subject matter.

FIG. 2 illustrates a high level flow diagram of an example non-limiting computer-implemented process 200 for developing and applying on or more answer rephrasing models to automatically rephrase answers to a question to accommodate the talking styles of the entities proposing the questions in accordance with one or more embodiments of the disclosed subject matter.

With reference to FIGS. 1 and 2, in various embodiments, process 200 provides a high level flow of the features and functionalities of system 100. In this regard, process 200 is divided into a model development phase and a model application phase. The model development phase demonstrates the role of the answer rephrasing model development module 104 and the model application phase demonstrates the role of the answer rephrasing module 112.

In the model development phase, at 202 the answer rephrasing model development module 104 can initially develop or prepare the parallel question and answer corpus (e.g., parallel question and answer corpus 116) that will be used to train the answer rephrasing models (e.g., the one or more answer rephrasing models 122). At 204, the answer rephrasing model development module 104 clusters the entities into groups. In this regard, the answer rephrasing model development module 104 can determine cluster the different entity provided versions of the answers included in the parallel question and answer corpus 116 into two or more groups based on talking style and/or one or more other relevant and distinguishing factors (e.g., age, educational level, cultural background, etc.). Then at 206, the answer rephrasing model development module 104 can train a defined machine learning answer rephrasing model for each (or in some implementations one or more) of the entity groups to learn how to rephrase standard answers to questions included in the parallel question and answer corpus.

In the model application phase, the answer rephrasing module 112 receive s entity proposed question at 208. At 210, the answer rephrasing module 112 can than classify the talking style of the entity or otherwise classify the entity into a particular group determined at the use group clustering step. Based on the particular classification of the entity, at 212 the answer rephrasing module 112 can then select and apply the corresponding answer rephrasing model to generate a rephrased or rewritten version of the standard answer to the proposed question.

Various additional features and functionalities of the answer rephrasing model development module 104 are discussed with reference to FIGS. 3 and 4 and various additional features and functionalities of the answer rephrasing module 112 are discussed with reference to FIGS. 5 and 6.

Figure 3:
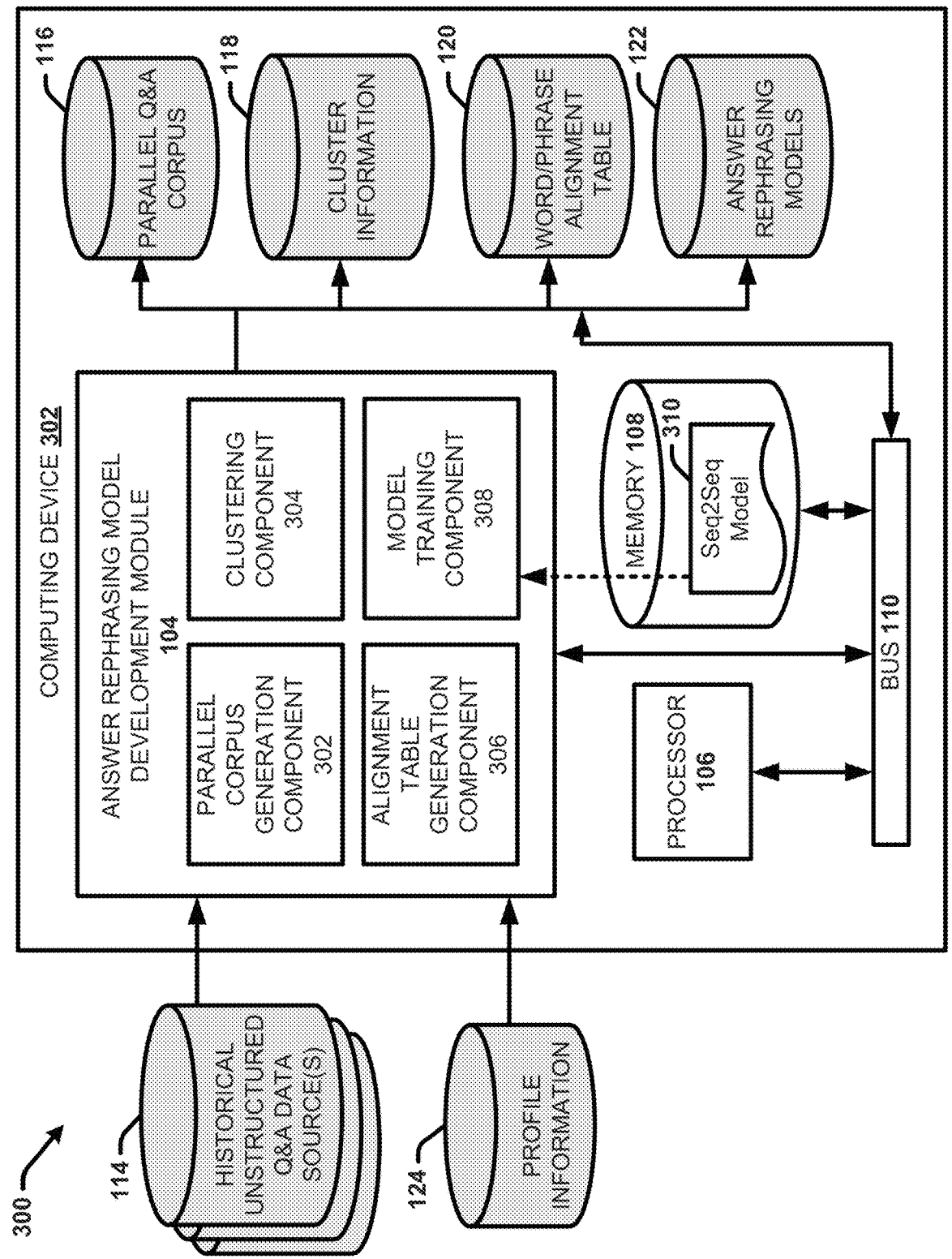
FIG. 3 illustrates a block diagram of an example, non-limiting system that facilitates generating one or more answer rephrasing models and that provide for automatically rephrasing an answer to a question to accommodate the talking style of the entity proposing the question in accordance with one or more embodiments of the disclosed subject matter.

FIG. 3 illustrates a block diagram of an example, non-limiting system 300 that facilitates generating one or more answer rephrasing models and that provide for automatically rephrasing an answer to a question to accommodate the talking style of the entity proposing the question in accordance with one or more embodiments of the disclosed subject matter. In this regard, system 300 can be employed to perform the model development elements of process 200. In various embodiments, system 300 is a subsystem of system 100 (e.g., system 100 can include system 300, and vice versa). For example, system 300 can include the unstructured question and answer data sources 114, the profile information 124, and computing device 301. Computing device 301 can include at least some of the components of computing device 102, including the answer rephrasing model development module 104, the processor 106, the memory 108, the device bus 110, the parallel question and answer corpus 116, the cluster information 118, the word/phrase alignment table 120 and the one or more answer rephrasing models 122. Repetitive description of like elements employed in other embodiments described herein is omitted for sake of brevity.

In one or more embodiments, the answer rephrasing model development module 104 can include parallel corpus generation component 302, clustering component 304, alignment table generation component 306 and model training component 308. The parallel corpus generation component 302 can generate the parallel question and answer corpus 116. In this regard, the parallel corpus generation component 302 can scan the one or more historical unstructured question and answer data sources 114 to identify different versions of standard questions and standard answers. In some implementations, the standard questions and answers can include a defined set of standard questions and answers. For example, in association with application of system 300 to facilitate automatically generating rephrased versions of medical questions, the defined set of standard questions and answers can include a list of textbook or standard medical questions and their corresponding textbook or standard answers. According to this example, the parallel corpus generation component 302 can scan the one or more historical question and answer data sources to identify different versions of the standard questions and the standard answers, extract this information and employ it to generate the parallel question and answer corpus. In another implementation, the parallel corpus generation component 302 can look for different versions of standard questions and answers that fall into a defined category (e.g., medical questions and answers, medical question and answers related to diabetes, medical questions and answers related to spinal surgery, etc.).

The clustering component 304 can evaluate the different versions of the answers included in the parallel question and answer corpus 116 to cluster them based on different entity groups. In this regard, the clustering component 304 can determine the particular entity group associated with each version (or in some implementations one or more) of a standard answer included in the parallel question and answer corpus 116. Information classifying each answer version with a particular entity groups can further be provided in the parallel question and answer corpus 116 or defined in the cluster information 118. In some embodiments, the different entity groups can correspond to different talking styles. In this regard, the clustering component 304 can determine the particular talking style associated with each version (or in some implementations one or more) of a standard answer included in the parallel question and answer corpus 116. Information classifying each answer version with a particular talking style can further be provided in the parallel question and answer corpus or defined in the cluster information 118.

In some embodiments, in addition to or in the alternative to developing the answer rephrasing models 122 that are trained to re-write answers to standard questions based on different talking styles, the answer rephrasing models 122 can consider other factors associated with different individuals that can reflect the words and syntax that used for answers to a same question. For example, other factors can include but are not limited to: age, intellectual level, educational level, professional background, cultural background, mental state, medical history, and the like. According to these embodiment, in addition or in the alternative to clustering different versions of standard answers included in the parallel question and answer corpus 116 based on the respective talking styles of the entities associated with the different answer versions, the clustering component 304 can cluster the answers based on association with different entity groups. These different entity groups can reflect different ages, intellectual levels, educational levels, professional backgrounds, cultural backgrounds, mental states, medical histories, and the like. It should be appreciated that these additional factors can vary based on the subject matter for which the answer rephrasing models are developed.

In one implementation with respect to the medical field, some questions proposed by entities could be directed to subject matter that is relatively sensitive and the answer to which could be very disheartening depending on mental and/or physical state of the individual proposing the question. According to this implementation, the answer rephrasing model development module 104 can train one or more answer rephrasing models to re-write or rephrase answers to certain medical questions based on the mental and/or physical state (e.g., physical health condition) of the entity proposing the question. In this regard, the manner in sensitive or negative content is conveyed to an entity can be tailored to account for their mental and/or physical state (e.g., is this a student proposing the question for alchemic reasons or a patient actually just diagnosed with stage III pancreatic cancer?).

In some embodiments, the different entity groups can be predefined (e.g., entity group 1, entity group 2, entity group 3, entity group 4 and so on). For example, with respect to talking style, the different entity groups can correspond to talking style 1, talking style 2, talking style 3, talking style 4, and so on. The number of entity groups can vary (and would generally include two or more different talking styles). The characteristic that define a particular entity group can also vary. For example, in some implementations, with respect to talking styles, different talking styles can reflect different levels of knowledge in the question and answer subject matter. In another example, predefined entity groups can be based on entities of defined age ranges (e.g., ages 4-7, ages 7-12, ages 12 to 18, ages 18-30, ages 31-50, etc.), entities of defined educational backgrounds and the like. Information defining the different entity groups can further be provided in the cluster information 118. In other implementations, the clustering component 304 can determine the different entity groups based on analysis of the parallel question and answer corpus data using one or more machine learning techniques. For example, based on analysis of the different versions of the standard answers and the different entities associated with the different versions, the clustering component 304 can identify patterns in the data to determine two or more different types of entity groups reflected in the data (e.g., answers reflective of two or more different talking styles, answers reflective of two or more different types of entities characterized by other distinguishing factors aside from talking styles, and the like). With these implementations, the clustering component 304 can define the number and characteristics of the different entity groups. For example, with respect to talking style alone, the clustering component 304 can define the number and type of different talking styles reflected in the data. The clustering component 304 can further associate information defining the different entity groups in the cluster information 118.

In another embodiment, the clustering component 304 can determine the entity groups associated with the respective different answers based on profile information 124 associated with the entities to whom the different versions of the answers were directed or who provided the different answers. For example, with respect to medical questions and answers and historical unstructured question and answer data comprising different versions of standard answer provided to different patients by a healthcare professional, the clustering component 304 can look at profile information for the respective patients to determine a particular reason for the different answers were provided (e.g., an entity group and/or talking style of the respective entities). In another example, with respect to medical answers provided by patients in association with answering follow up medical questions, the clustering component 304 can look into the profile information associated with the respective patients to determine the particular entity group and/or talking style of the respective patients. In this regard, the profile information 124 can associate each entity (e.g., or in some implementations one or more entity) with information identifying (e.g., entity group 1, talking style 1) or indicating (e.g., based on demographic factors), the entity group and/or talking style of the entity.

Still in another embodiment, with respect to talking style, the clustering component 304 can analyze natural language provided by an entity to determine the talking style of the entity using one or more defined machine learning algorithms. In this regard, the clustering component 304 can evaluate the terms used and the syntax used by an entity to characterize the talking style of the entity. For example, with respect to a version of a standard answer to a medical question provided to a patient that asked the medical question, the clustering component 304 can evaluate the terms and manner in which the entity phrased the question to determine the talking style of the entity. The clustering component 304 can further associate that version of the standard answer with the determined talking style.

The model training component 308 can further employ the parallel question and answer corpus 116 with information clustering the different versions of the answers with different entity groups and/or talking styles to train a defined answer rephrasing model on the different entity groups and/or talking styles. The result can include a plurality of different answer rephrasing models, wherein each model (or ins some implementations one or more) can be configured to generate rephrased versions of standard answers to accommodate a different entity group and/or talking style. In one or more embodiments, this defined answer rephrasing model can employ a seq2seq recurrent neural network architecture, also referred to as a long short term memory (LSTM) architecture. This seq2seq model can be stored in memory 108 and is identified in system 300 as seq2seq model 310.

Sequence to sequence (seq2seq) modeling is an effective way of using the LSTM recurrent neural network architecture. The general LSTM seq2seq has two different LSTM cells, used for input and output. The cell for the input is referred to as the encoder and its purpose is to convert variable length sentences into fixed sized vector representations. Sentences that are similar in meaning can have similar vector representations. The cell used for the output is referred to as the decoder and its purpose is to find the conditional probability for outputs with respect to inputs. In this regard, the first LSTM encoder cell finds the vector representation of the given inputs which is then fed to the second LSTM decoder cell as initial values to calculate the conditional probability.

In one or more exemplary embodiments, the subject seq2seq model 310 is a modified seq2seq model that uses a both a copy function and a restricted generative function. In particular, the modified seq2seq model comprises two encoders, one to encode the standard question and the other to encode the standard question. Further, instead of using the traditional recurrent neural network decoder, the seq2seq model 310 uses two unique decoders to simulate copying and rewriting behaviors for answer rephrasing, wherein some rephrased answers or portions of the rephrased answers can be copied from the standard answer, and wherein some rephrased answers or portions of the rephrased answers can be replaced with different words or phrases. In this regard one of the decoders comprises a copy decoder that can be configured to copy a term or phrase from the standard answer and the other decoder can comprises a restricted generative decoder that can be configured to generate a word or phrases from a synonym words/phrases table, referred to herein as the alignment table. According, the subject seq2seq model 310 not only consider the original answers but also the questions raised entity (e.g., the entity proposed question or the corresponding standard question). The seq2seq model 310 further comprises a predictor function that can be configured to determine, based on the input question, the standard answer and the other parts of the rephrased answer, which decoder to use for respective terms and phrases of the rephrased answered.

Figure 4:
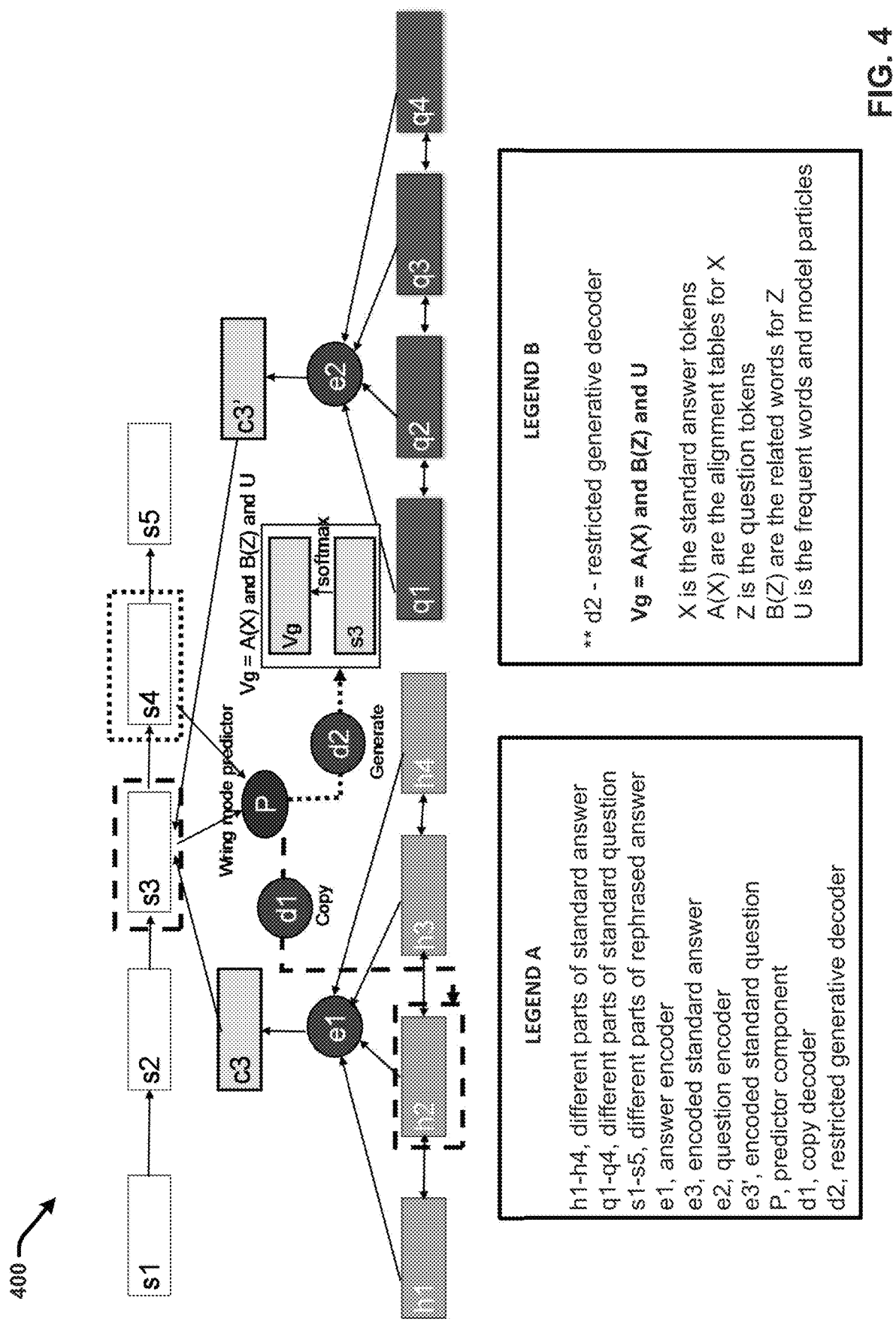
FIG. 4 provides an example sequence-to-sequence (seq2seq) model that provides for automatically generating rephrased answers questions based on the respective talking styles of the entities proposing the questions in accordance with one or more embodiments of the disclosed subject matter.

FIG. 4 provides an example sequence-to-sequence (seq2seq) model 400 that provides for automatically generating rephrased answers questions based on the respective talking styles of the entities proposing the questions in accordance with one or more embodiments of the disclosed subject matter. In various embodiments, seq2seq model 400 can include same or similar features and functionalities as seq2seq model 310, and vice versa. Repetitive description of like elements employed in other embodiments described herein is omitted for sake of brevity.

In the embodiment shown, the seq2seq model is or has generated a rephrased version of a standard answer to a question. The respective blocks s1, s2, s3, s4 and s5 collectively correspond to the rephrased answer, wherein each of the respective blocks correspond to different parts (e.g., terms or phrases) of the rephrased answer. In this regard, the output of the seq2seq model 400 in this example implementation is the rephrased answer s1-s5.

The seq2seq model 400 comprises two LSTM encoders, respectively shown as e1 and e2. The LSTM encoder e1 can be configured to encode the standard answer, which is collectively depicted the respective blocks h1, h2, h3 and h4. In this regard, the different blocks h1, h2, h3 and h4 can respectively correspond to different parts (e.g., terms or phrases) of the standard answer. The LSTM encoder e2 can be configured to encode the entity provided question or the corresponding standard version of the entity provided question, which is collectively depicted the respective blocks q1, q2, q3 and q4. In this regard, the different blocks q1, q2, q3 and q4 can respectively correspond to different parts (e.g., terms or phrases) of the standard question. The output of the first LSTM encoder e1 is represented by c3, which is an encoded representation of the standard answer. The output of the second LSTM encoder e2 is represented by c3', which is an encoded version of the entity asked question (or corresponding standard version of the question). In one or more implementations, c3 can be a latent state of the standard answer and c3' can be a latent state of the standard question. For example, in one implementation, $X=[x\_1, x\_2, \ldots, x\_n]$ can denote the source sequence of original answer and $Z=[z\_1, z\_2, \ldots, z\_m]$ can denote the source sequence of question. The answer encoder e1 can be configured to encode the source answer sequence into a state c3 (e.g., $h\_t = f(x\_t, h\_(t-1))$, $c = Q(h\_1, h\_2, \ldots, h\_n)$), and the question encoder e2 can be configured to encode the question sequence into a state c3', (e.g., $q\_t = f(z\_t, q\_(t-1))$, $c' = Q(q\_1, q\_2, \ldots, q\_n)$).

The seq2seq model 400 further includes two decoders that can be collectively configured to decode c3 and c3'. These decoders include a copying decoder d1 and a restrictive generative decoder d2. The copying decoder d1 can be configured select parts (e.g., words or phrases) of the standard answer to copy into the rephrased answer. For example, in many implementations, most words in the rephrased answer will include original terms in the standard answer. The copying decoder d1 accounts for this. For instance, in furtherance to the above example, the output of the copying decoder is as follows: $P\_c(y\_t|y<t, X, Z) = 1$ if $y\_t = X\_t$ and 0 otherwise.

The restrictive generative decoder d2 on the other hand can be configured to select one or more alternative words and phrases from an alignment table (e.g., word/phrase alignment table 120) to employ in the rephrased answer, wherein the words and phrases in the alignment table can be different versions (e.g., synonyms) of corresponding words and phrases included in the standard answer. The restricted generative decoder d2 restricts the output to a small yet highly relevant vocabulary according to the input question and answer text. For example, in the embodiment shown, the restrictive generative decoder corresponds to $V\_g = A(X)$ and $B(Z)$ and U, where X is the standard answer tokens and $A(X)$ are the alignment tables for X and Z is the question tokens and $B(Z)$ are the related words for Z and U is the frequent words and model particles. The output of the restrictive generative decoder d2 is the softmax of the terms in $V\_g$ while the selection of terms in $V\_g$ consider both the c and c'.

To combine the two decoders, the seq2seq model 400 can include a binary sequence labeling task to decide whether the current target word/phrase should come from copying (e.g., using of the copying decoder d1), or rewriting (e.g., usage of the restrictive generative decoder d2). In the embodiment shown, this labeling task can be performed by the predictor component/function, represented in a P in FIG. 4. The predictor component/function P can determine based on c3, c3' and the whether to employ the copy decoder function or the restrictive generative decoder function. Specifically, for each hidden state s_t, the predictor component function P can be configured to determine the probability of using copying or generative decoder at the current part of the rephrase answer that needs to be generated. For example, in the embodiment shown, s3 is shown in a wide dashed box to indicate that the predictor component/function P determined the appropriate decoder for this part s3 of the rephrased answer was the copy decoder d1. On the other hand, s4 is shown in a narrow dashed box to indicate that the predictor component/function P determined the appropriate decoder for this part s4 of the rephrased answer was the restrictive generative decoder d2. In this regard, when the seq2seq model 400 is trained for a particular entity group/learning style, the predictor component/function learn which parts of the standard answer should come from the copy decoder function and which parts should come from the restricted generative function based on both the standard answer and the question.

With reference again to FIG. 4, in one or more embodiments, in addition to employing the parallel question and answer corpus 116 information to develop or train the one or more answer rephrasing models 122, the alignment table generation component 306 can further employ the parallel question and answer corpus 116 to generate the word/phrase alignment table 120. The word/phrase alignment table 120 can comprise, for each standard answer (or in some cases one or more), alternative words/phrases (e.g., synonyms) for different parts of the standard answer, wherein each of the alternative words/phrases are associated with a different entity group/talking style. In one or more embodiments, the alignment table generation component 306 can generate the word/phrase alignment table 120 by mining the different words/phrases included in the different versions of the answers provided in the parallel question and answer corpus 116. The word/phrase alignment table 120 can further train a word embedding function on the corpus, and cluster the phrases/terms to group similar phrases and terms.

Figure 5:
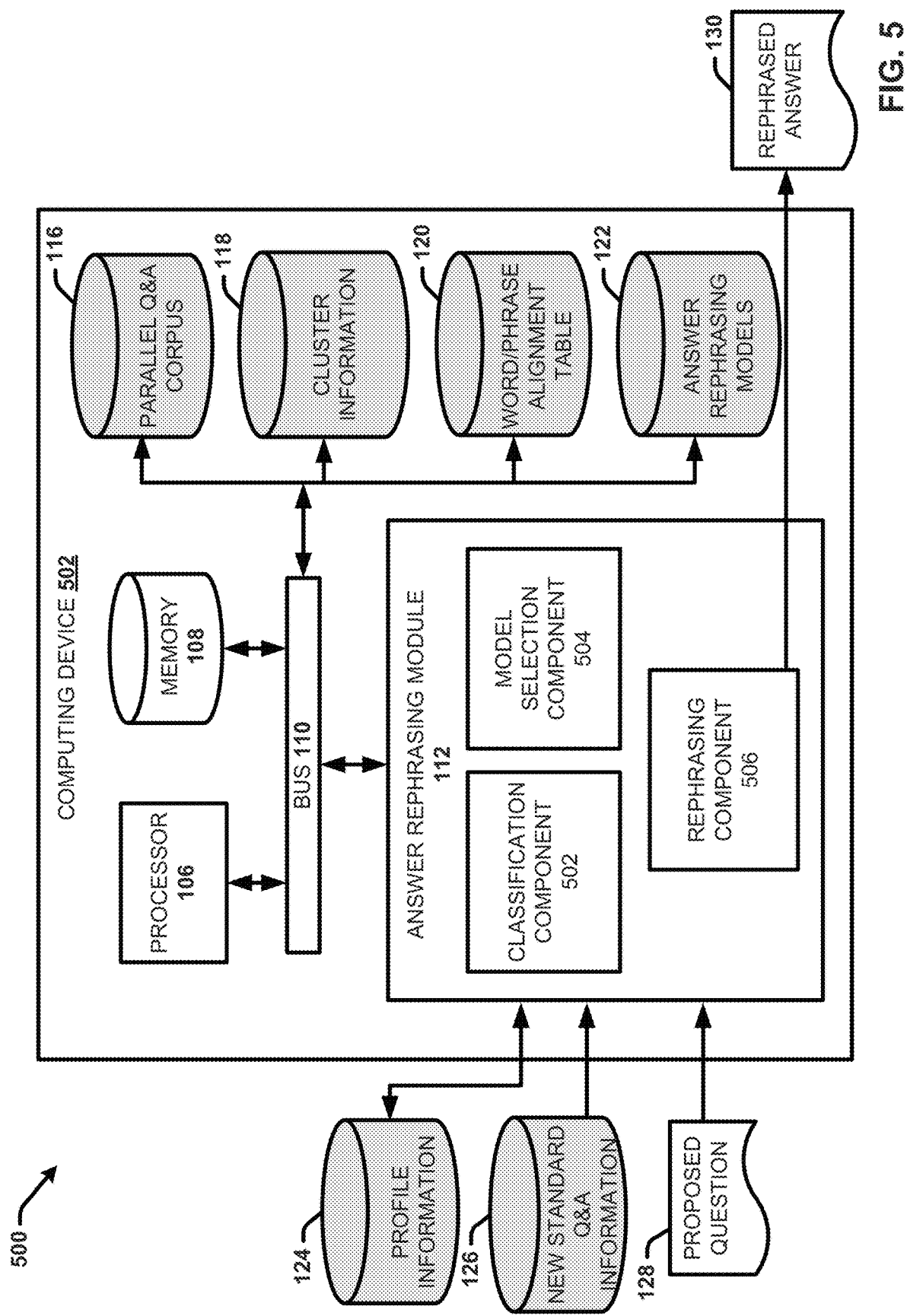
FIG. 5 illustrates a block diagram of an example, non-limiting system that facilitates employing one or more answer rephrasing models to automatically provide rephrased answers to questions to accommodate the respective talking styles of the entities proposing the questions in accordance with one or more embodiments of the disclosed subject matter.

FIG. 5 illustrates a block diagram of an example, non-limiting system 500 that facilitates employing one or more answer rephrasing models to automatically provide rephrased answers to questions to accommodate the respective talking styles of the entities proposing the questions in accordance with one or more embodiments of the disclosed subject matter. In this regard, system 300 can be employed to perform the elements of the model application phase of process 200. In various embodiments, system 500 is a subsystem of system 100 (e.g., system 100 can include system 500, and vice versa). For example, system 500 can include the profile information 124, the new standard question and answer information, the proposed question 128, the rephrased answer 130 and computing device 501. Computing device 501 can include at least some of the components of computing device 102, including the answer rephrasing module 112, the processor 106, the memory 108, the device bus 110, the parallel question and answer corpus 116, the cluster information 118, the word/phrase alignment table 120 and the one or more answer rephrasing models 122. Repetitive description of like elements employed in other embodiments described herein is omitted for sake of brevity.

In one or more embodiments, the answer rephrasing module can include classification component 502, model selection component 504 and rephrasing component 506. The classification component 502 can determine the particular entity group/talking style associated with the entity that proposes a proposed question 128. In some embodiments, the entity can be associated with accessible profile information (e.g., in the profile information 124) that identifies or indicates the entity group/talking style of the entity. With these embodiments, the classification component 502 can determine the group/talking style based on the profile information associated with the entity. In another embodiment, the classification component can employ one or more same or similar techniques as the clustering component 304 to determine the entity group/talking style of the entity that proposes the proposed question 128. For example, in one implementation, the classification component 502 can evaluate the manner in which the entity proposed the question (e.g., the terms and syntax) to determine the group/talking style classification of the entity.

Once the group/talking style has been determined, the model selection component 504 can access the one or more answer rephrasing models 122 to identify and select one of the models that is particularly tailored to the group/talking style. The rephrasing component 506 can further apply the selected answer rephrasing model to generate the rephrased answer 130 and provide the rephrased answer to the entity (e.g., via a client device employed by the entity). For example, the rephrasing component can determine the standard answer to the entity proposed question using information included in the parallel question and answer corpus 116 or the new standard question and answer information 126. Then using the identified standard answer and the proposed question 128 (or a standard version of the proposed question 128) as input, the chose answer rephrasing model, and the word/phrase alignment table 120, the rephrasing component 506 can apply the chosen model to generate the rephrased answer 130.

Figure 6:
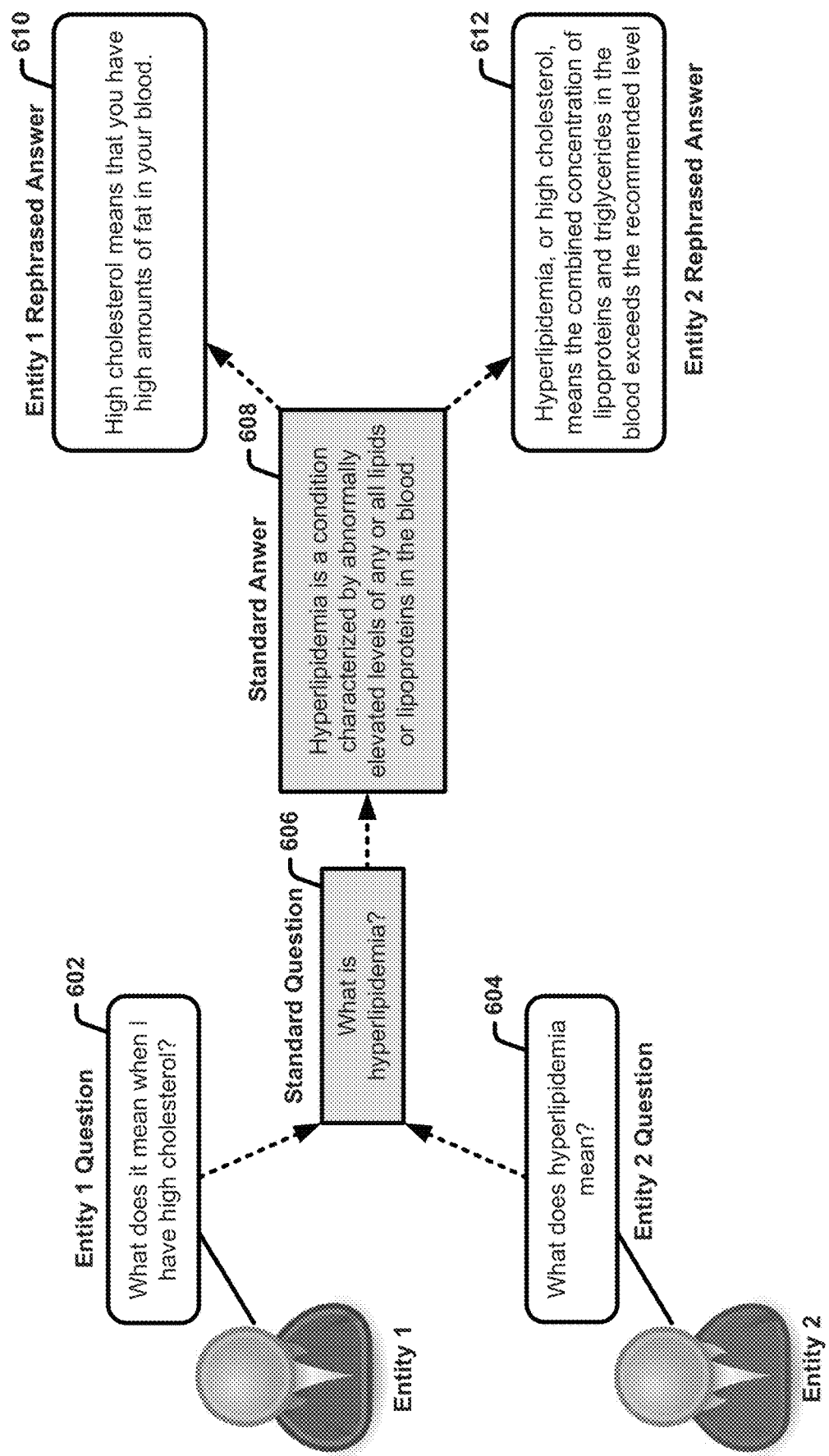
FIG. 6 provides an example use case of the disclosed techniques for automatically providing different rephrased answerers to a same medical question based on the respective talking styles of the entities proposing the questions in accordance with one or more embodiments of the disclosed subject matter.

FIG. 6 provides an example use case of the disclosed techniques for automatically providing different rephrased answerers to a same medical question based on the respective talking styles of the entities proposing the questions in accordance with one or more embodiments of the disclosed subject matter. Repetitive description of like elements employed in respective embodiments is omitted for sake of brevity.

In the embodiment shown, two different entities (e.g., entity 1 and entity 2) respectively associated with different entity groups/talking styles are shown asking a same or similar medical question. For example, the entity 1 provide a first version 602 of the standard question 606 and entity 2 provides a second version 604 of the standard question 606. In one embodiment, based on reception of either of the entity provided versions of the question, the answer rephrasing module 112 can correlate the entity questions to the standard textbook answer of the question (e.g., standard question 606) and further the standard answer of the standard question 606. Further, the answer rephrasing module can generate different versions of the standard answer 608 for each of the different entities based on their entity groups/talking styles by application of the corresponding answer rephrasing models. For example, in the embodiment shown, entity 1 is provided with a more simplified rephrased version (e.g., version 610) of the standard answer 608 relative to the rephrased version of the standard answer provided to entity 2, (rephrased version 612).

Figure 7:
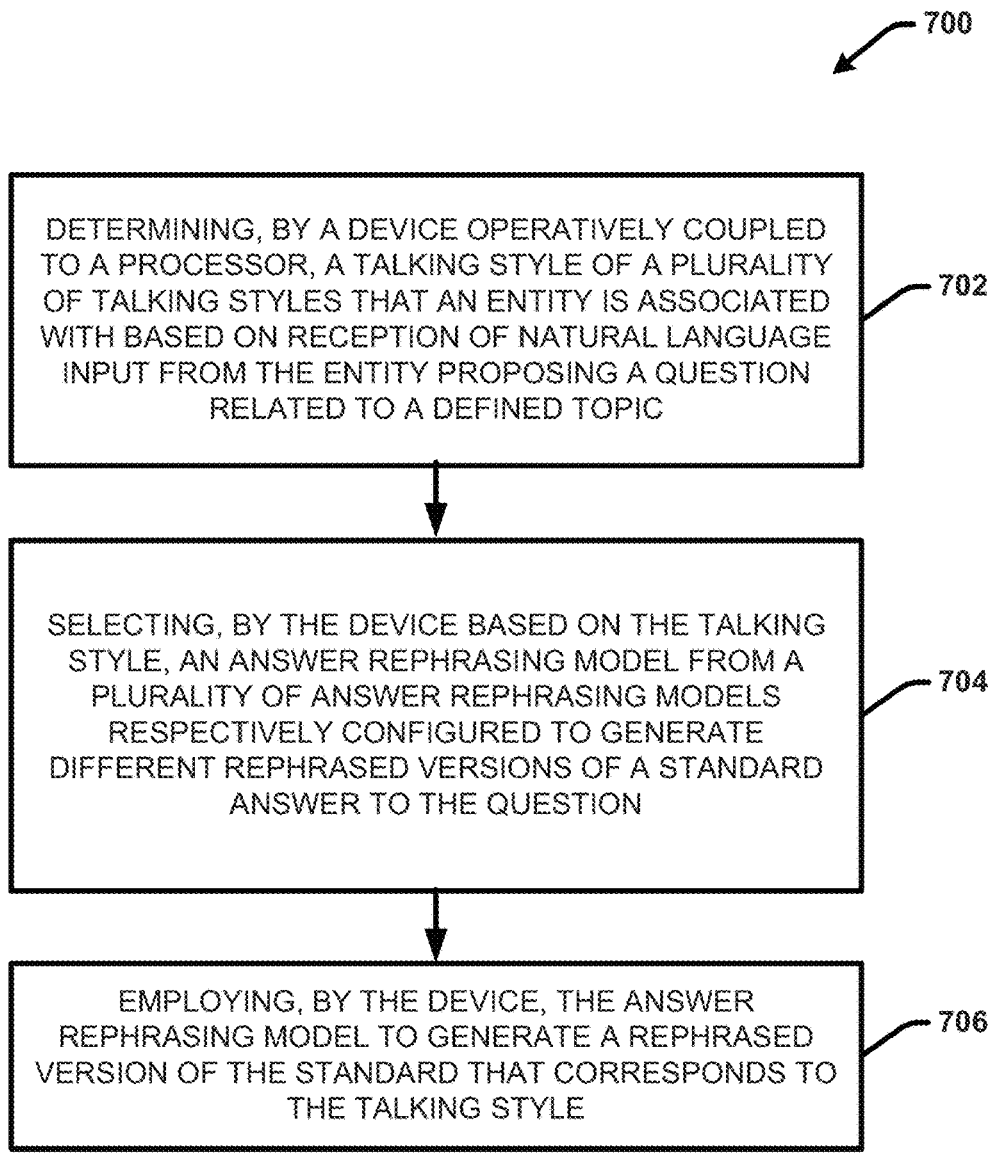
FIG. 7 provides a flow diagram of an example, non-limiting computer-implemented method for automatically rephrasing an answer to a question to accommodate the talking style of the entity proposing the question in accordance with one or more embodiments of the disclosed subject matter.

FIG. 7 provides a flow diagram of an example, non-limiting computer-implemented method 700 for automatically rephrasing an answer to a question to accommodate the talking style of the entity proposing the question in accordance with one or more embodiments of the disclosed subject matter. Repetitive description of like elements employed in respective embodiments is omitted for sake of brevity.

At 702, determining, a device operatively coupled to a processor (e.g., computing device 102, computing device 501, and the like), determines a talking style of a plurality of talking styles that an entity is associated with based on reception of natural language input from the entity proposing a question related to a defined topic (e.g., using classification component 502). At 704, the device selects, based on the talking style, an answer rephrasing model from a plurality of answer rephrasing models respectively configured to generate different rephrased versions of a standard answer to the question (e.g., using model selection component 504). At 706, the device employs the answer rephrasing model to generate a rephrased version of the standard that corresponds to the talking style (e.g., using rephrasing component 506).

Figure 8:
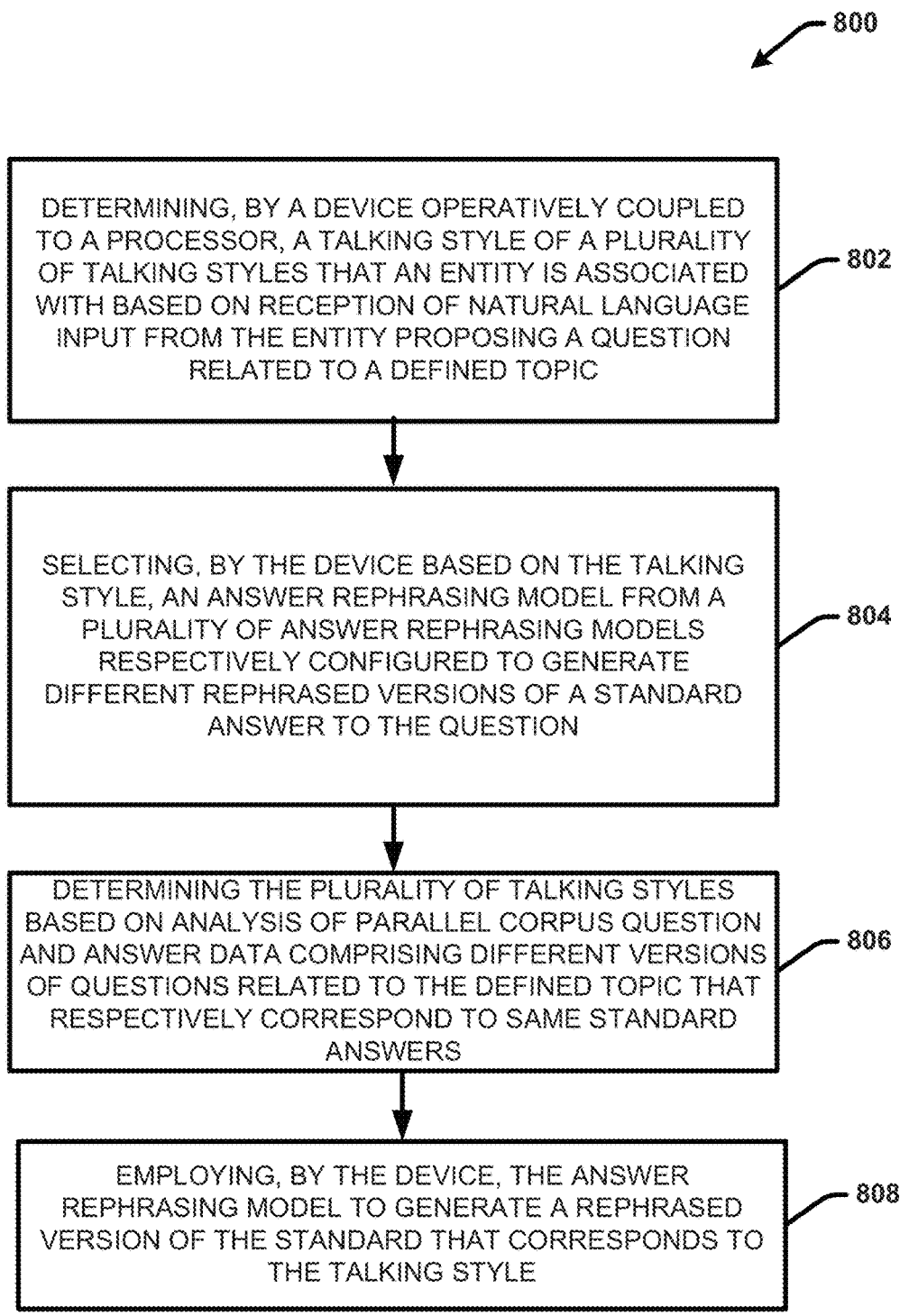
FIG. 8 provides a flow diagram of an example, non-limiting computer-implemented method for automatically rephrasing an answer to a question to accommodate the talking style of the entity proposing the question in accordance with one or more embodiments of the disclosed subject matter.

FIG. 8 provides a flow diagram of an example, non-limiting computer-implemented method 800 for automatically rephrasing an answer to a question to accommodate the talking style of the entity proposing the question in accordance with one or more embodiments of the disclosed subject matter. Repetitive description of like elements employed in respective embodiments is omitted for sake of brevity.

At 802, determining, a device operatively coupled to a processor (e.g., computing device 102, computing device 501, and the like), determines a talking style of a plurality of talking styles that an entity is associated with based on reception of natural language input from the entity proposing a question related to a defined topic (e.g., using classification component 502). At 804, the device selects, based on the talking style, an answer rephrasing model from a plurality of answer rephrasing models respectively configured to generate different rephrased versions of a standard answer to the question (e.g., using model selection component 504). At 806, the device determines the plurality of talking styles based on analysis of parallel corpus question and answer data comprising different versions of questions related to the defined topic that respectively correspond to same standard answers (e.g., using classification component 502), and at 808, the device employs the answer rephrasing model to generate the rephrased version of the standard answer (e.g., using rephrasing component 506).

Figure 9:
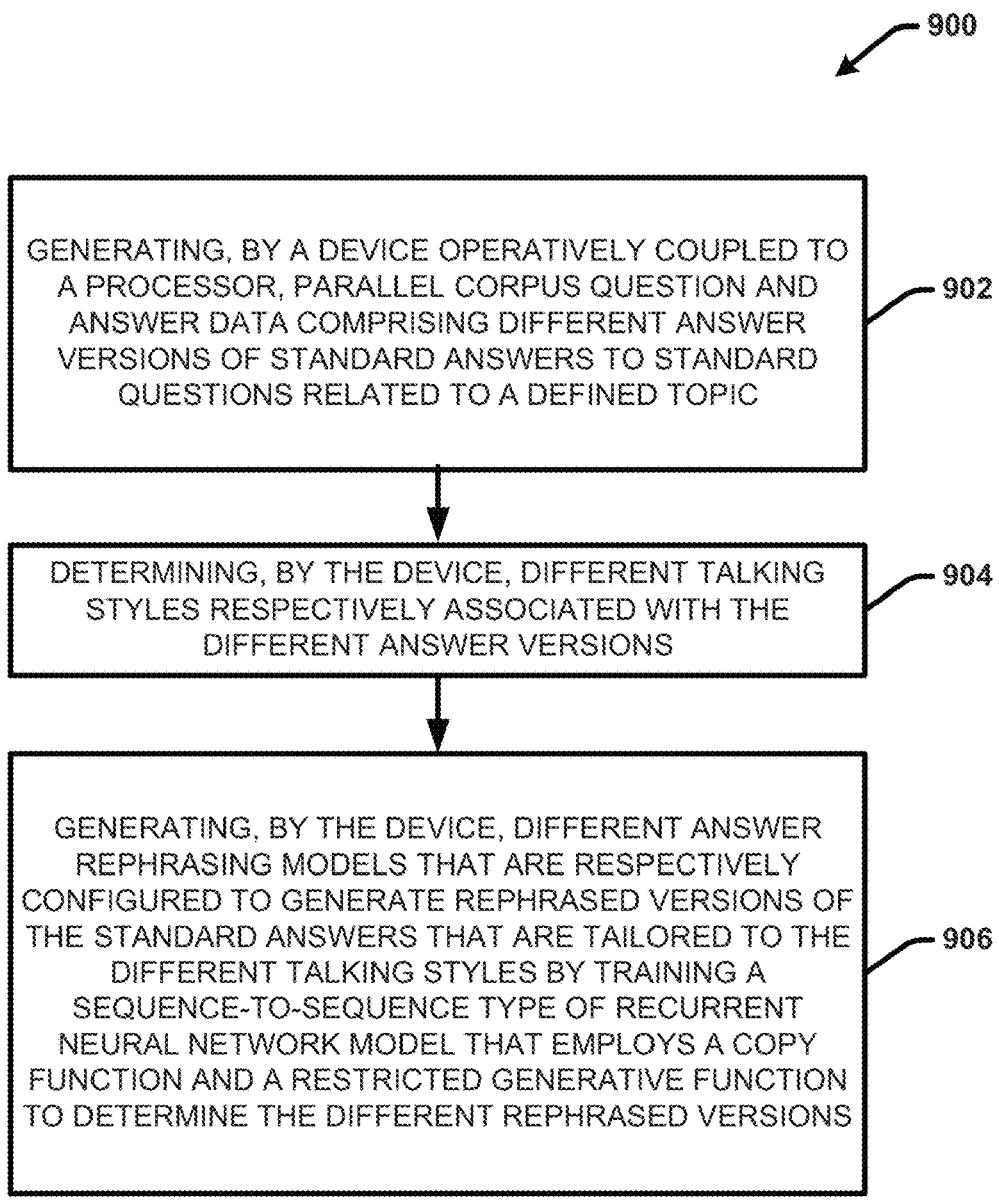
FIG. 9 provides a flow diagram of an example, non-limiting computer-implemented method for automatically rephrasing an answer to a question to accommodate the talking style of the entity proposing the question in accordance with one or more embodiments of the disclosed subject matter.

FIG. 9 provides a flow diagram of an example, non-limiting computer-implemented method 900 for automatically rephrasing an answer to a question to accommodate the talking style of the entity proposing the question in accordance with one or more embodiments of the disclosed subject matter. Repetitive description of like elements employed in respective embodiments is omitted for sake of brevity.

At 902, a device operatively coupled to a processor (e.g., computing device 102, computing device 301 and the like), generating, by a device operatively coupled to a processor, parallel corpus question and answer data comprising different answer versions of standard answers to standard questions related to a defined topic (e.g., using the parallel corpus generation component 302). At 904, the device determines different talking styles respectively associated with the different answer versions (e.g., using the clustering component 304). At 906, the device generates different answer rephrasing models that are respectively configured to generate rephrased versions of the standard answers that are tailored to the different talking styles by training a sequence-to-sequence type of recurrent neural network model that employs a copy function and a restricted generative function to determine the different rephrased versions (e.g., using the model training component 308).

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the entity's computer, partly on the entity's computer, as a stand-alone software package, partly on the entity's computer and partly on a remote computer or entirely on the remote computer or server. In the latter scenario, the remote computer can be connected to the entity's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 10:
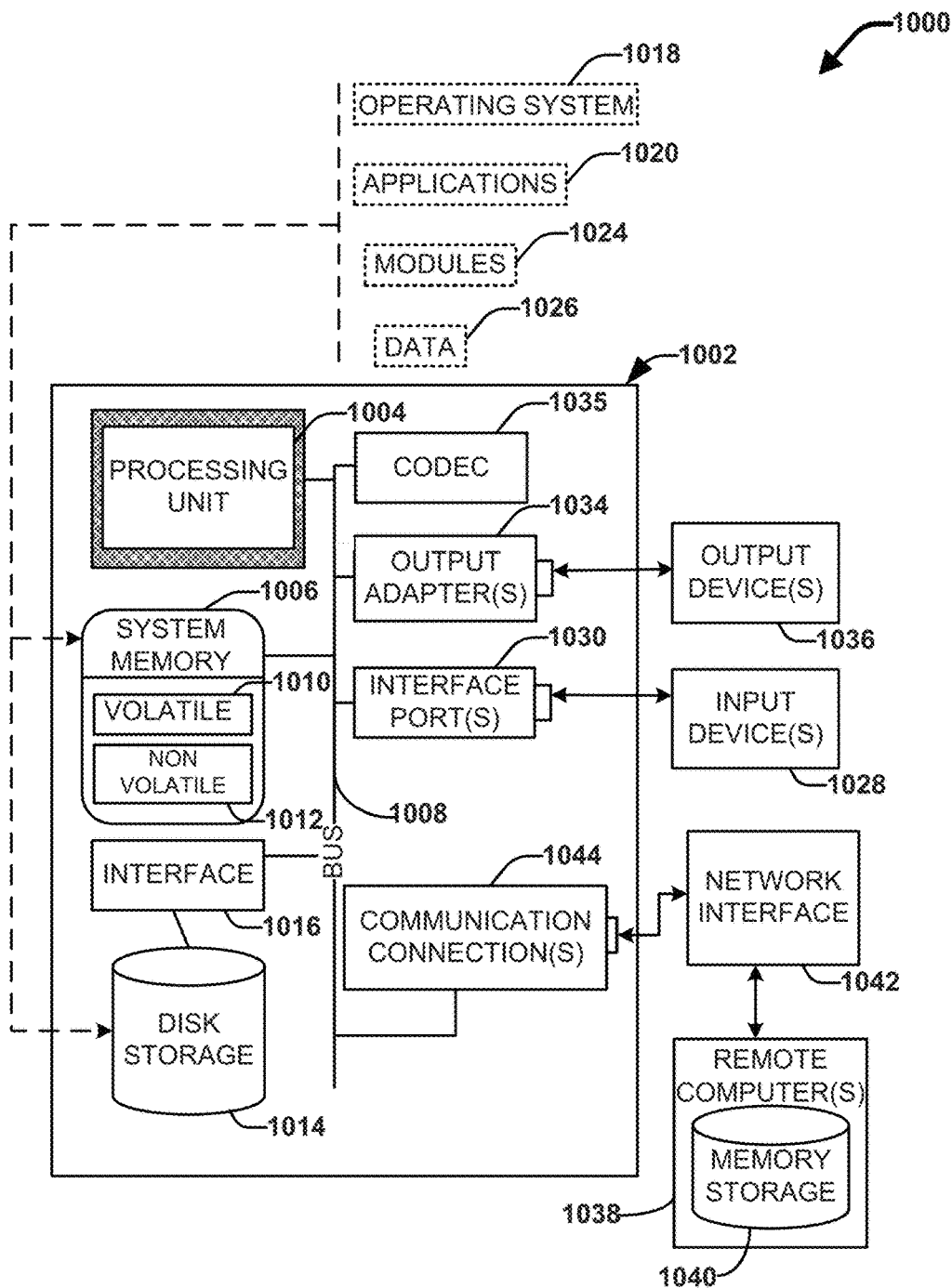
FIG. 10 illustrates a block diagram of an example, non-limiting operating environment in which one or more embodiments described herein can be facilitated.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1014 to the system bus 1008, a removable or non-removable interface is typically used, such as interface 1016. It is appreciated that disk storage 1014 can store information related to an entity. Such information might be stored at or provided to a server or to an application running on an entity device. In one embodiment, the entity can be notified by way of output device(s) 1036) of the types of information that are stored to disk storage 1014 or transmitted to the server or application. The entity can be provided the opportunity to opt-in or opt-out of having such information collected or shared with the server or application (e.g., by way of input from input device(s) 1028).

It is to be appreciated that FIG. 10 describes software that acts as an intermediary between entities and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

An entity enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes the computer executable components stored in the memory, wherein the computer executable components comprise:
      a classification component that determines a talking style of a plurality of talking styles that an entity is associated with based on reception of input from the entity proposing a question related to a defined topic; and
      a model selection component that selects, based on the talking style, an answer rephrasing model from a plurality of answer rephrasing models respectively configured to generate different rephrased versions of a standard answer to the question, wherein respective answer rephrasing models of the plurality of answer rephrasing models employ a sequence-to-sequence type of recurrent neural network architecture.

2. The system of claim 1, wherein the computer executable components further comprise:
   a clustering component that determines the plurality of talking styles based on analysis of parallel corpus question and answer data comprising different versions of questions related to the defined topic that respectively correspond to same standard answers.

3. The system of claim 1, wherein different answer rephrasing models of the plurality of answer rephrasing models are tailored to different talking styles of the plurality of talking styles.

4. The system of claim 3, wherein the different answer rephrasing models respectively employ a neural network structure and wherein the computer executable components further comprise:
   a modeling component that generates the different answer rephrasing models by training the different answer rephrasing models using parallel corpus question and answer data that comprises different versions of same standard answers and respectively associates the different versions with the different talking styles.

5. The system of claim 1, wherein the respective answer rephrasing models employ a copy function and a restricted generative function to determine the different rephrased versions of the standard answer to the question.

6. The system of claim 1, wherein the respective answer rephrasing models determine the different rephrased versions of the standard answer to the question based on encoding the standard answer and the question, thereby resulting in an encoded answer and an encoded question.

7. The system of claim 6, wherein the respective answer rephrasing models determine the different rephrased versions of the standard answer to the question using either a copy function or a restricted generative function to decode respective parts of the encoded answer and the encoded question.

8. The system of claim 7, wherein the respective answer rephrasing models comprise a selection component that determines whether to apply the copy function or the restricted generative function to decode the respective parts of the encoded answer and the encoded question.

9. The system of claim 7, wherein the copy function selects a term or phrase from the standard answer.

10. The system of claim 7, wherein the restricted generative function selects an alternative term or phrase from an alignment table data that correlates one or more alternative terms or phrases with standard terms or phrases of the standard answer.

11. The system of claim 1, wherein the defined topic comprises health and medicine.

12. A computer implemented method, comprising:
    determining, by a device operatively coupled to a processor, a talking style of a plurality of talking styles that an entity is associated with based on reception of input from the entity proposing a question related to a defined topic; and
    selecting, by the device based on the talking style, an answer rephrasing model from a plurality of answer rephrasing models respectively configured to generate different rephrased versions of a standard answer to the question, wherein respective answer rephrasing models of the plurality of answer rephrasing models employ a sequence-to-sequence type of recurrent neural network architecture.

13. The computer implemented method of claim 12, further comprising:
    determining, by the device, the plurality of talking styles based on analysis of parallel corpus question and answer data comprising different versions of questions related to the defined topic that respectively correspond to same standard answers.

14. The computer implemented method of claim 12, wherein different answer rephrasing models of the plurality of answer rephrasing models are tailored to different talking styles of the plurality of talking styles.

15. The computer implemented method of claim 14, wherein the different answer rephrasing models respectively employ a neural network structure and wherein the method further comprises:
    a modeling component that generates the different answer rephrasing models by training the different answer rephrasing models using parallel corpus question and answer data that comprises different versions of same standard answers and respectively associates the different versions with the different talking styles.

16. The computer implemented method of claim 12, wherein the respective answer rephrasing models employ a copy function and a restricted generative function to determine the different rephrased versions of the standard answer to the question.

17. A computer program product for automatically generating rephrased versions of answers to questions, wherein the rephrased versions are tailored to different talking styles, the computer program product comprising a computer readable storage medium having program instructions embodied therewith, the program instructions executable by a processing component to cause the processing component to:
- determine a talking style of a plurality of talking styles that an entity is associated with based on reception of input from the entity proposing a question related to a defined topic; and
- select, based on the talking style, an answer rephrasing model from a plurality of answer rephrasing models respectively configured to generate different rephrased versions of a standard answer to the question, wherein respective answer rephrasing models of the plurality of answer rephrasing models employ a sequence-to-sequence type of recurrent neural network architecture.

18. The computer program product of claim 17, wherein a restricted generative function to determine the different rephrased versions of the standard answer to the question.

* * * * *